United States Patent
Lee et al.

(10) Patent No.: US 11,146,981 B2
(45) Date of Patent: Oct. 12, 2021

(54) METHOD BY WHICH V2X TERMINAL PERFORMS V2X COMMUNICATION IN WIRELESS COMMUNICATION SYSTEM AND TERMINAL USING METHOD

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 16/327,777

(22) PCT Filed: Aug. 24, 2017

(86) PCT No.: PCT/KR2017/009288
§ 371 (c)(1),
(2) Date: Feb. 22, 2019

(87) PCT Pub. No.: WO2018/038565
PCT Pub. Date: Mar. 1, 2018

(65) Prior Publication Data
US 2019/0223046 A1     Jul. 18, 2019

Related U.S. Application Data

(60) Provisional application No. 62/378,735, filed on Aug. 24, 2016.

(51) Int. Cl.
*H04W 28/02* (2009.01)
*H04W 72/02* (2009.01)
(Continued)

(52) U.S. Cl.
CPC ......... *H04W 28/0231* (2013.01); *H04W 4/40* (2018.02); *H04W 72/02* (2013.01);
(Continued)

(58) Field of Classification Search
CPC ... H04W 28/0231; H04W 4/40; H04W 72/02; H04W 72/1263; H04W 72/0406; H04L 67/12
(Continued)

(56) References Cited

U.S. PATENT DOCUMENTS

2009/0257382 A1* 10/2009 Qi ..................... H04L 5/0037
                                                            370/329
2018/0234220 A1*  8/2018 Yasukawa .............. H04W 4/40

FOREIGN PATENT DOCUMENTS

WO         2015160158         10/2015

OTHER PUBLICATIONS

PCT International Application No. PCT/KR2017/009288, International Search Report dated Nov. 24, 2017, 4 pages.
(Continued)

*Primary Examiner* — Chi Tang P Cheng
(74) *Attorney, Agent, or Firm* — Lee, Hong, Degerman, Kang & Waimey

(57) ABSTRACT

The present invention provides a method by which a vehicle-to-X (V2X) terminal performs a V2X operation in a wireless communication system, comprising: determining a physical sidelink control channel (PSCCH) and a physical sidelink shared channel (PSSCH), which are related to a specific transport block to be transmitted; and transmitting the PSCCH and the PSSCH, which are related to the transport block, wherein the PSCCH and the PSSCH are transmitted continuously during a transmission period.

9 Claims, 13 Drawing Sheets

(51) Int. Cl.
  *H04W 4/40*    (2018.01)
  *H04W 72/12*   (2009.01)
  *H04L 29/08*   (2006.01)
  *H04W 72/04*   (2009.01)

(52) U.S. Cl.
  CPC ......... *H04W 72/1263* (2013.01); *H04L 67/12* (2013.01); *H04W 72/0406* (2013.01)

(58) Field of Classification Search
  USPC ........................................................ 370/329
  See application file for complete search history.

(56) References Cited

OTHER PUBLICATIONS

Intel Corporation, "On timing relationship between sensing window, packet arrival, resource reselection trigger, PSCCH and PSSCH transmissions", R1-166513, 3GPP TSG RAN WG1 Meeting #86, Aug. 2016, 8 pages.

Itl, "Details on PSCCH/PSSCH transmission timing in UE autonomous resource selection mode", R1-167751, 3GPP TSG RAN WG1 Meeting #86, Aug. 2016, 4 pages.

Samsung, "Timeline of PSCCH/PSSCH transmission and resource reservation", R1-166715, 3GPP TSG RAN WG1 #85, Aug. 2016, 5 pages.

Intel Corporation, "Remaining details of PSCCH and PSSCH physical layer structure for V2V communication", R1-166509, 3GPP TSG RAN WG1 Meeting #86, Aug. 2016, 9 pages.

\* cited by examiner

METHOD BY WHICH V2X TERMINAL PERFORMS V2X COMMUNICATION IN WIRELESS COMMUNICATION SYSTEM AND TERMINAL USING METHOD

CROSS-REFERENCE TO RELATED APPLICATIONS

This application is the National Stage filing under 35 U.S.C. 371 of International Application No. PCT/KR2017/009288, filed on Aug. 24, 2017, which claims the benefit of U.S. Provisional Application No. 62/378,735, filed on Aug. 24, 2016, the contents of which are all hereby incorporated by reference herein in their entirety.

BACKGROUND OF THE INVENTION

Field of the invention

The present invention relates to wireless communication, and more particularly, to a method of performing V2X communication performed by a V2X terminal in a wireless communication system, and a terminal using the method.

Related Art

In the International Telecommunication Union Radio communication sector (ITU-R), the standardization task of International Mobile Telecommunication (IMT)-Advanced, that is, a next-generation mobile communication system after the 3rd generation, is in progress. IMT-Advanced has an object of supporting multimedia services based on the Internet protocol (IP) at a transfer rate of 1 Gbps in the still and low-speed moving state and 100 Mbps in the high-speed moving state.

3rd Generation Partnership Project (3GPP) is a system standard that satisfies the requirements of IMT-Advanced and prepares LTE-advanced (LTE-A) improved from long term evolution (LTE) based on the orthogonal frequency division multiple access (OFDMA)/single carrier-frequency division multiple access (SC-FDMA) transmission method. LTE-A is one of strong candidates for IMT-Advanced.

There is recently a growing interest in the device-to-device (D2D) technology for direct communication between devices. Specifically, D2D has been in the spotlight as a communication technology for a public safety network. A commercial communication network rapidly changes into LTE, but the current public safety network is chiefly based on the 2G technology due to the problem of a collision against the existing communication standard and in terms of costs. Such a technology gap and needs for improved services lead to efforts to improve the public safety network.

The D2D communication described above may be extended to be applied to transmission and reception of signals between vehicles, and communication related to vehicles is specifically termed vehicle-to-everything (V2X) communication. In V2X, the alphabet 'X' represents a pedestrian (communication between a vehicle and a device carried by an individual (e.g., handheld terminal carried by a pedestrian, cyclist, driver, or passenger), here, V2X may be represented by V2P), a vehicle (communication between vehicles, here, V2V), an infrastructure/network (communication between a vehicle and a roadside unit (RSU)/network (e.g., RSU is a transportation infrastructure entity, (e.g., an entity transmitting speed notifications) implemented in an eNB or a stationary UE)) (V2I/N), and the like. A (V2P communication-related) device carried by a pedestrian (or a person) will be referred to as a "P-UE" and a (V2X communication-related) device installed in a vehicle will be referred to as a "V-UE". In the present disclosure, the term of "entity" may be interpreted as at least one of "P-UE", "V-UE", and RSU (/network/infrastructure).

Under a congestion situation of a wireless communication system to which V2X communication is applied, there is a problem in that overall system performance is decreased when terminals perform communication thereof without any restriction on a resource occupancy rate/frequency or the like. However, in the legacy V2X system, under the congestion situation, when the terminal transmits a physical sidelink control channel (PSCCH) (or scheduling assignment (SA)) related to a specific transport block (TB) and a physical sidelink shared channel (PSSCH) (or data), there is no predefined restriction related to a transmission duration of the terminal (e.g., a restriction on how to occupy a resource).

Accordingly, the present invention intends to provide a method of allowing a terminal to abide by a predefined restriction (e.g., T_ON, T_OFF, etc.) (for each measured congestion level), wherein a V2X message TX operation thereof (e.g., transmission of a PSCCH and PSSCH for a specific transport block) is effectively performed under the restriction, and an apparatus using the method.

SUMMARY OF THE INVENTION

The present invention provides a method of performing V2X communication performed by a V2X terminal in a wireless communication system, and a terminal using the method.

In an aspect, a method for a vehicle-to-X (V2X) operation performed by a V2X user equipment (UE) in a wireless communication system is provided. The method comprises determining a physical sidelink control channel (PSCCH) and physical sidelink shared channel (PSSCH) related to a specific transport block to be transmitted and transmitting the PSCCH and PSSCH related to the transport block, wherein the PSCCH and the PSSCH are consecutively transmitted during a transmission duration.

All of the PSCCHs and PSSCHs related to the specific transport block may be transmitted only during the transmission duration.

The method may further comprise determining whether the PSCCH and the PSSCH are transmitted on one subframe distinctively on a frequency axis or whether the PSCCH and the PSSCH are transmitted on different subframes distinctively on a time axis.

When a channel busy ratio (CBR) is high, the PSCCH and the PSSCH may be transmitted on one subframe distinctively on the frequency axis.

The PSCCH and the PSSCH may be transmitted in a frequency division multiplexing (FDM) manner.

When the CBR is low, the PSCCH and the PSSCH may be transmitted on different subframes distinctively on the time axis.

The PSCCH and the PSSCH may be transmitted in a time division multiplexing (TDM) manner.

The PSCCH and PSSCH related to the specific transport block may be transmitted repeatedly only within the transmission duration.

When a plurality of PSSCHs are associated with the PSCCH, the plurality of PSSCHs may be transmitted consecutively with respect to the PSCCH.

When the PSCCH is transmitted on an Nth subframe within the transmission duration, the plurality of PSSCHs may be transmitted consecutively starting from the Nth subframe, and wherein the PSCCH and the PSSCH transmitted on the Nth subframe are distinctive on a frequency axis, where N is a natural number.

When the PSCCH is transmitted on an Nth subframe within the transmission duration, the plurality of PSSCHs may be transmitted consecutively starting from an (N+1)th subframe, where N is a natural number.

When the PSCCH and the PSSCH are transmitted at different time points and an interval greater than or equal to a pre-set value is required between the PSCCH transmission and the PSSCH transmission, a transmission resource having an interval less than the pre-set value from the PSCCH transmission may be excluded from a transmission resource of the PSSCH.

The PSCCH may be a sidelink control channel, and the PSSCH may be a sidelink data channel.

In another aspect, a vehicle-to-X (V2X) user equipment (UE) is provided. The UE comprises a radio frequency (RF) unit transmitting and receiving a radio signal and a processor operatively coupled to the RF unit, wherein the processor is configured to determine a physical sidelink control channel (PSCCH) and physical sidelink shared channel (PSSCH) related to a specific transport block to be transmitted and transmit the PSCCH and PSSCH related to the transport block, wherein the PSCCH and the PSSCH are consecutively transmitted during a transmission duration.

According to the present invention, there is provided a method of allowing a terminal to abide by a predefined restriction (e.g., T_ON, T_OFF, etc.) (for each measured congestion level), wherein a V2X message TX operation thereof (e.g., transmission of a PSCCH and PSSCH for a specific transport block) is effectively performed within the restriction, and an apparatus using the method. Accordingly, since an operation in which the terminal performs transmission is simplified, implementation complexity of the terminal can be decreased. Further, since a duration of a radio resource occupied by the terminal to perform PSCCH and PSSCH transmission is decreased, it is advantageous in terms of co-existence between V2X terminals. Furthermore, since the duration of the radio resource occupied by the terminal is decreased, a possibility of co-existence between entities which use a technique different from that of the V2X terminal can be increased.

DESCRIPTION OF EXEMPLARY EMBODIMENTS

Figure 1:
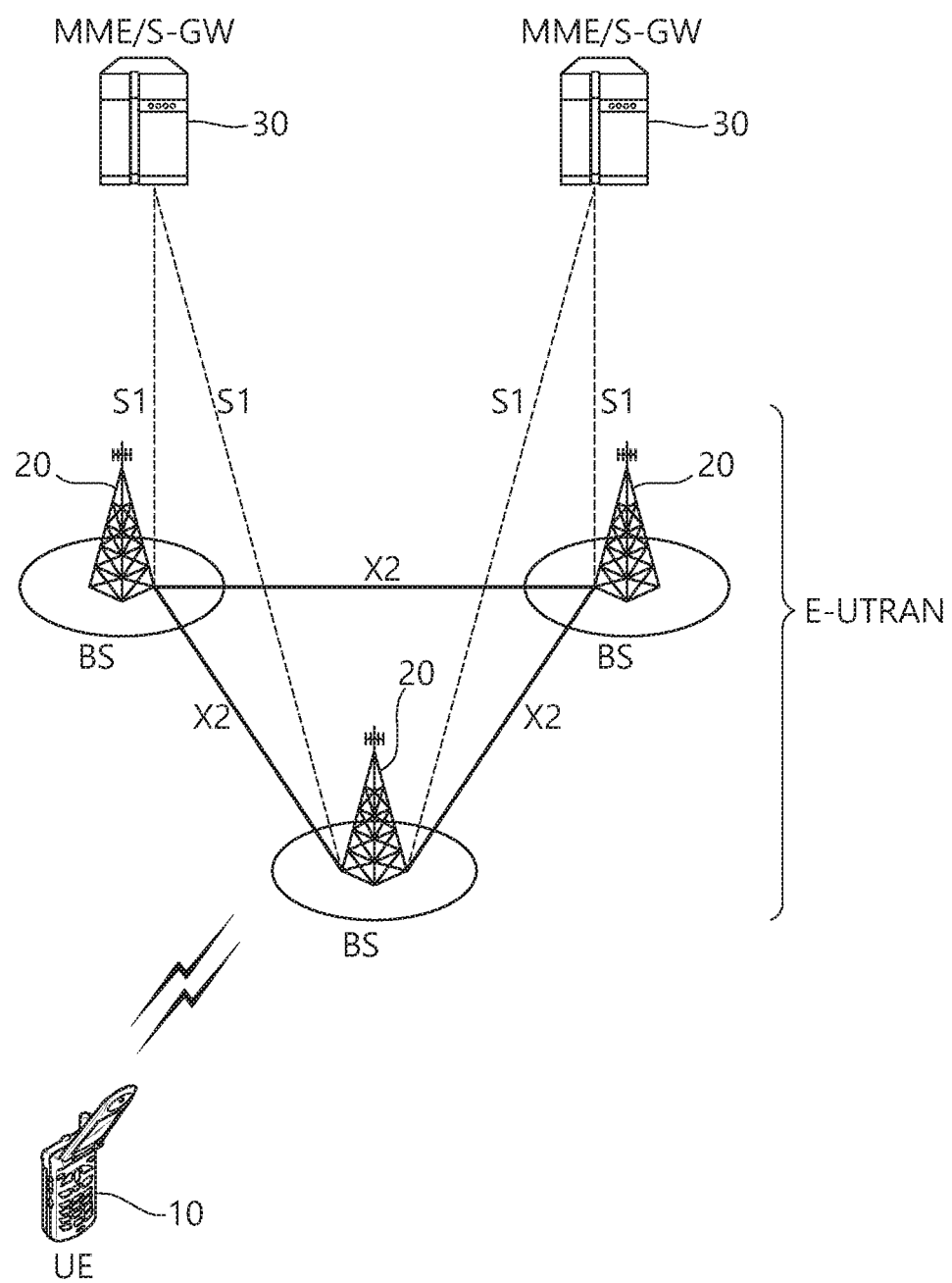
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 2:
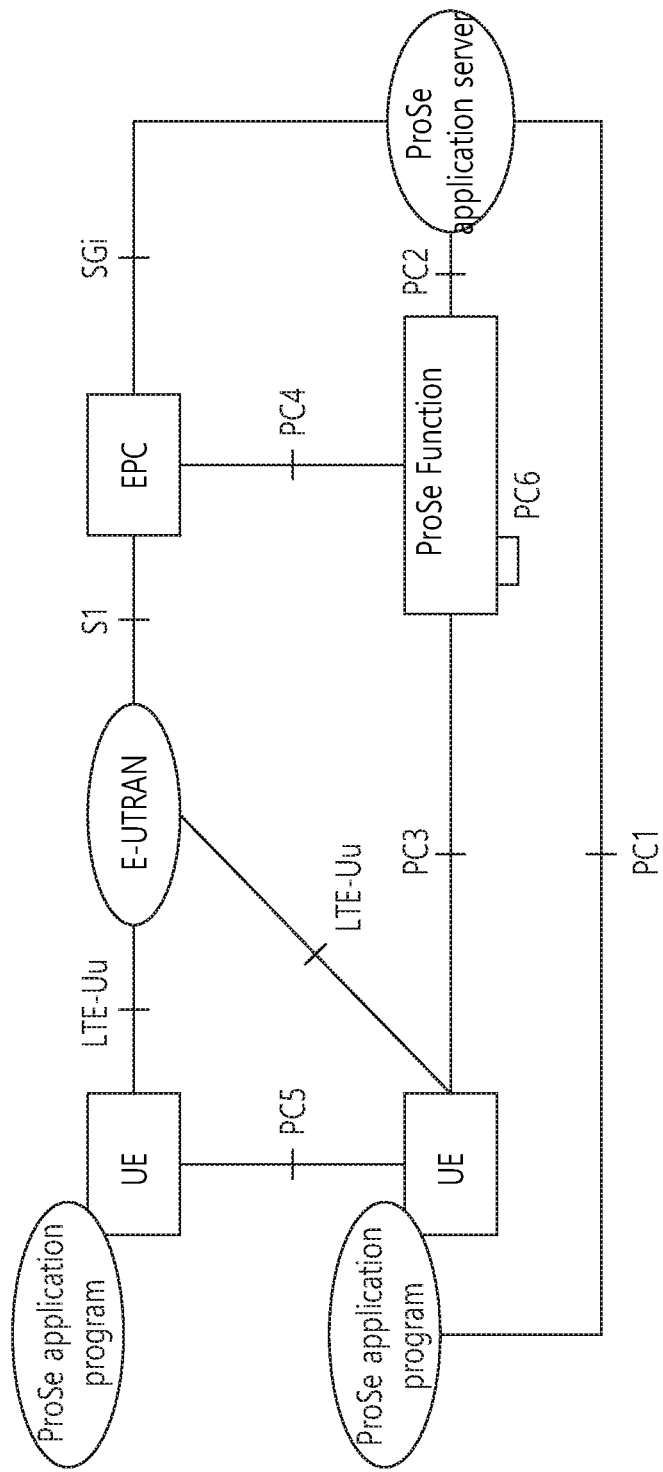
FIG. 2 illustrates a reference structure for a ProSe.

FIG. 2 illustrates a reference structure for a ProSe.

Referring to FIG. 2, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
  Interworking via a reference point towards the 3rd party applications
  Authorization and configuration of the UE for discovery and direct communication)
  Enable the function of the EPC level ProSe discovery
  ProSe related new subscriber data and handling of data storage, and also handling of ProSe identities
  Security related function
  Provide control towards the EPC for policy related function
  Provide function for charging (via or outside of EPC, e.g., offline charging))

Hereinafter, a reference point and a reference interface will be described in a reference structure for the ProSe.
  PC1: a reference point between a ProSe application program in the terminal and a ProSe application program in a ProSe application server. The PC1 is used to define signaling requirements in an application level.
  PC2: is a reference point between the ProSe application server and a ProSe function. The PC2 is used to define an interaction between the ProSe application server and a ProSe function. An application data update of a ProSe database of the ProSe function may be an example of the interaction.
  PC3: is a reference point between the terminal and the ProSe function. The PC3 is used to define an interaction between the terminal and the ProSe function. Configuration for ProSe discovery and communication may be an example of the interaction.
  PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
  PC5: is a reference point to use control/user plane for discovery, communication, and relay between terminals, and 1:1 communication.
  PC6: is a reference point to use a function such as ProSe discovery between users included in different PLMNs.
  SGi: may be used for application data and application level control information exchange.

<ProSe direct communication (D2D communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 3:
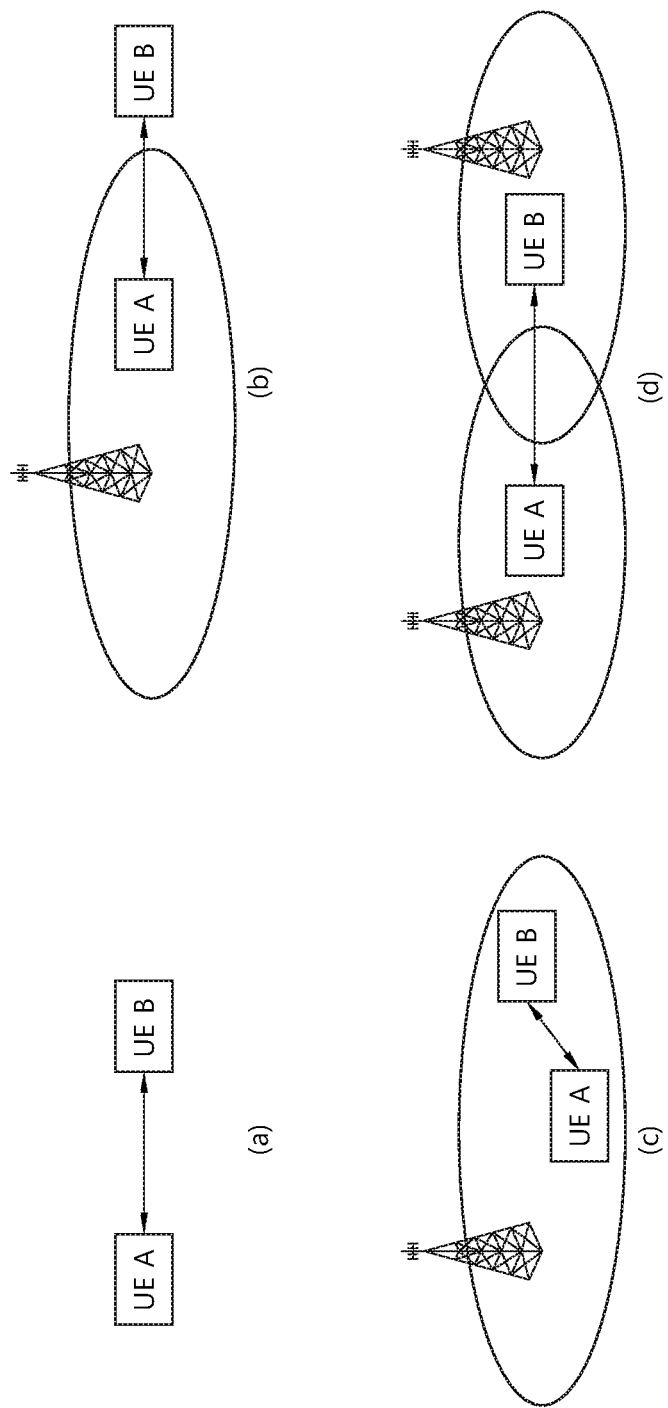
FIG. 3 illustrates arrangement examples of terminals performing ProSe direct communication and cell coverage.

FIG. 3 illustrates arrangement examples of terminals performing ProSe direct communication and cell coverage.

Referring to FIG. 3(a), UEs A and B may be located outside of the cell coverage. Referring to FIG. 3(b), the UE A may be located in the cell coverage and the UE B may be located outside of the cell coverage. Referring to FIG. 3(c), both of UEs A and B may be located in the cell coverage. Referring to FIG. 3(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.
  Source layer-2 ID: The source layer-2 ID identifies a sender of a packet in a PC 5 interface.
  Purpose layer-2 ID: The purpose layer-2 ID identifies a target of a packet in a PC 5 interface.
  SA L1 ID: The SA L1 ID represents an in an ID in a scheduling assignment (SA) in the PC 5 interface.

Figure 4:
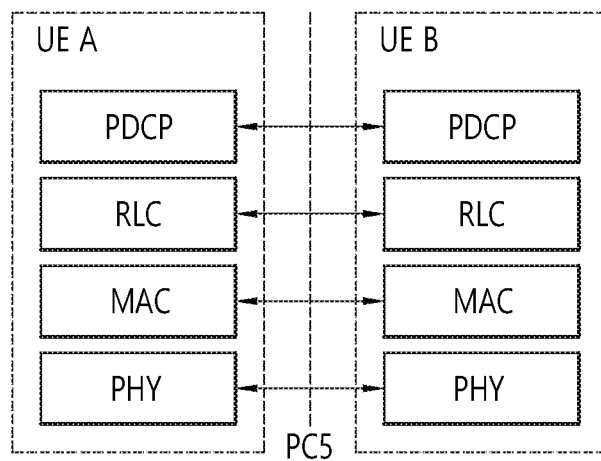
FIG. 4 illustrates a user plane protocol stack for the ProSe direct communication.

FIG. 4 illustrates a user plane protocol stack for the ProSe direct communication.

Referring to FIG. 4, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio resource assignment for ProSe direct communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 5:
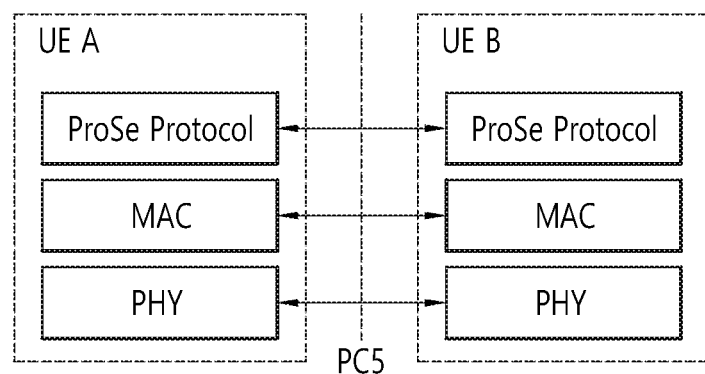
FIG. 5 illustrates a PC 5 interface for D2D discovery.

FIG. 5 illustrates a PC 5 interface for D2D discovery.

Referring to FIG. 5, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

<V2X (VEHICLE-TO-X) Communication>

As described above, in general, a D2D operation may have various advantages in that it is signal transmission/reception between close devices. For example, a D2D terminal may perform data communication at a high transfer rate and with low latency. Furthermore, the D2D operation can distribute traffic concentrated on an eNB. If a terminal performing a D2D operation plays the role of a relay, the D2D operation may also function to extend coverage of an eNB. Communication related to a vehicle, including signal transmission/reception between vehicles as the extension of the aforementioned D2D communication, is specially called VEHICLE-TO-X (V2X) communication.

In this case, for example, in V2X (VEHICLE-TO-X), a term "X" means A PEDESTRIAN (COMMUNICATION BETWEEN A VEHICLE AND A DEVICE CARRIED BY AN INDIVIDUAL (example) HANDHELD TERMINAL CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (example) RSU IS A TRANSPORTATION INFRASTRUCTURE ENTITY (example) AN ENTITY TRANSMITTING SPEED NOTIFICATIONS) IMPLEMENTED IN AN eNB OR A STATIONARY UE)) (V2I/N), etc. Furthermore, for example, for convenience of description of proposed methods, a device (related to V2P communication) carried by a pedestrian (or person) is named a "P-UE", and a device (related to V2X communication) installed on a vehicle is named a "V-UE." Furthermore, in the present invention, for example, a term "entity" may be construed as being a P-UE and/or a V-UE and/or an RSU (/NETWORK/INFRASTRUCTURE).

A V2X UE may perform message (or channel) transmission on a previously defined (or signaled) resource pool. In this case, the resource pool may mean a resource(s) previously defined so that the UE performs a V2X operation (or capable of performing the V2X operation). In this case, the resource pool may be defined from the viewpoint of time-frequency, for example.

Meanwhile, in V2X, a mode 3 may correspond to a scheduling mode based on a base station, and a mode 4 may correspond to a self-scheduling mode of a terminal. In this case, the terminal based on the mode 4 may determine a transmission resource on the basis of sensing, and thereafter performs V2X communication through the determined transmission resource.

In the aforementioned V2X system, a V2X terminal may determine a transmission resource on the basis of sensing, and thereafter may perform V2X communication on the determined transmission resource. In this situation, in order for the terminal to smoothly perform V2X communication, there is a need to control congestion on a radio resource. Accordingly, there is a need to provide a congestion control operation under V2X communication. Hereinafter, in the description on the congestion control, a channel busy ratio (CBR) will be described in brief with reference to the drawings.

Figure 6:
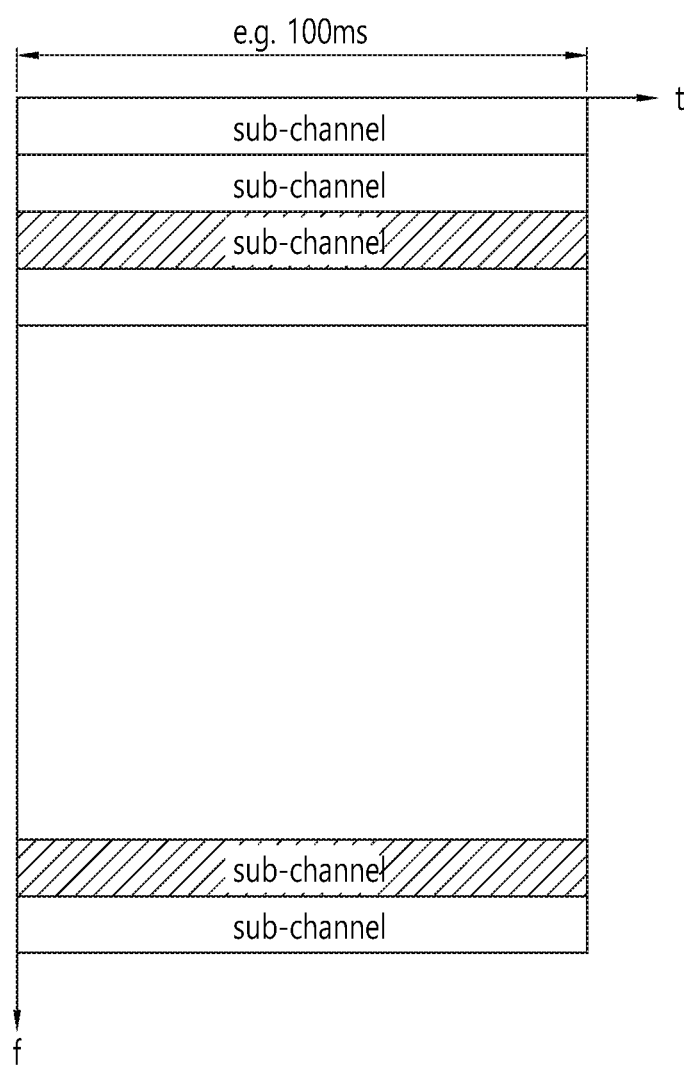
FIG. 6 schematically shows an example for a CBR.

FIG. 6 schematically shows an example for a CBR.

Referring to FIG. 6, the CBR may imply the number of sub-channels of which a received signal strength indicator (RSSI) measurement result value is greater than or equal to a pre-set threshold, as a result of measuring an RSSI by a terminal during 100 ms on a sub-channel basis. That is, the CBR may imply a ratio of a sub-channel of which a value is greater than or equal to a pre-set threshold among sub-channels during a specific duration. For example, in FIG. 6, assuming that a sub-channel indicated by a slashed line is a sub-channel of which a value is greater than or equal to a pre-set threshold, the CBR may imply a ratio of the sub-channel indicated by the slashed line during a duration of 100 ms.

Hereinafter, the present invention will be described.

Under a congestion situation of a wireless communication system to which V2X communication is applied, there is a problem in that overall system performance is decreased when terminals perform communication thereof without any restriction on a resource occupancy rate/frequency or the like. However, in the legacy V2X system, under the congestion situation, when the terminal transmits a physical sidelink control channel (PSCCH) (or scheduling assignment (SA)) related to a specific transport block (TB) and a physical sidelink shared channel (PSSCH) (or data), there is no predefined restriction related to a transmission duration of the terminal (e.g., a restriction on how to occupy a resource). In addition, in the legacy V2X system, as shown in the figure below, there is no predefined restriction related to the transmission duration of the terminal, in regards to retransmission of the PSCCH (or SA) and PSSCH (or data) related to the specific transport block.

Figure 7:
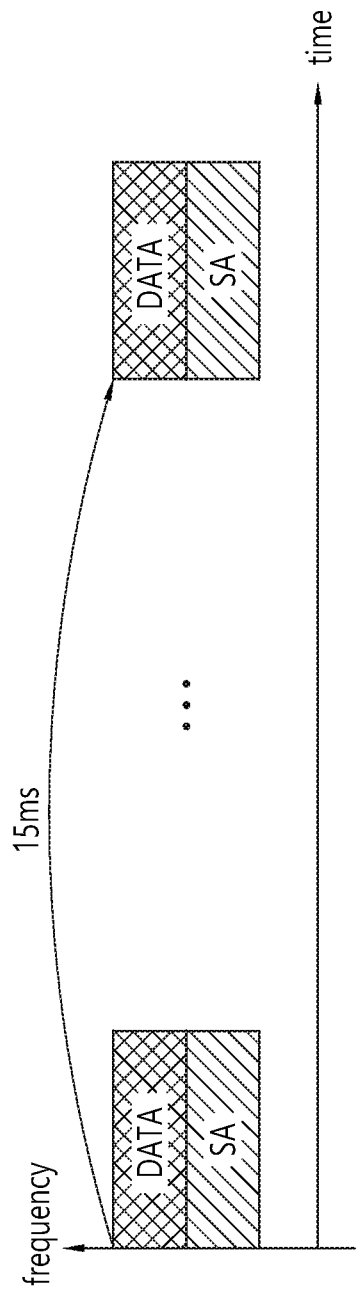
FIG. 7 schematically shows an example of retransmitting SA and data related to a specific transport block in a congestion situation.

FIG. 7 schematically shows an example of retransmitting SA and data related to a specific transport block in a congestion situation.

Referring to FIG. 7, the SA (or PSCCH) or data (PSSCH) related to the specific transport block may be configured such that the SA (or PSCCH) and data (PSSCH) related to the specific transport block are retransmitted, for example, within 15 ms without consideration of a predefined restriction (e.g., T_ON, T_OFF, etc.).

As described above, under a congestion situation, there is a problem in that overall system performance is decreased when terminals perform communication thereof without any restriction on a resource occupancy rate/frequency or the like.

Accordingly, the present invention intends to provide a method of allowing a terminal to abide by a predefined restriction (e.g., T_ON, T_OFF, etc.) (for each measured congestion level), wherein a V2X message TX operation thereof (e.g., transmission of a PSCCH and PSSCH for a specific transport block) is effectively performed within the restriction, and an apparatus using the method.

Herein, as described below, when the terminal consecutively performs transmission of all PSCCHs and PSSCHs related to the specific transport block within one transmission duration (T_ON), since an operation in which the terminal performs transmission is simplified, implementation complexity of the terminal can be decreased. Further, since a duration of a radio resource occupied by the terminal to perform PSCCH and PSSCH transmission is decreased, it is advantageous in terms of co-existence between V2X terminals. Furthermore, since the duration of the radio resource occupied by the terminal is decreased, a possibility of co-existence between entities which use a technique different from that of the V2X terminal can be increased.

For example, a congest control (CG_CTL) operation may be performed through transmitter (TX) parameter limitation(s) (based on (measured) channel occupancy level (CH_OCLVL)).

Herein, for example, ETSI describes a (regulatory) restriction on parameter(s) such as: (A) MAXIMUM T_ON; and/or (B) MINIMUM T_OFF; and/or (C) ((measured) CH_OCLVL (e.g., channel busy ratio (CBR)) based) TX UE MAXIMUM DUTY CYCLE, or the like for a CG_CTL operation on a (European) 5.9 GHz ITS band.

Herein, for example, "T_ON", "T_OFF", and "DUTY CYCLE" respectively denote "current duration of a transmission", "current allowed minimum time between two consecutive transmissions", and "ratio expressed as a percentage of the maximum transmitter on time on one carrier frequency, relative to 1 second". Herein, for example, a restriction related to "MINIMUM T_ON" and "MINIMUM T_OFF" may be configured (/signaled) respectively to "4 ms" and "25 ms (up to "1 s" when CBR>62%)".

That is, 'T_ON' may denote a current transmission duration, and 'T_OFF' may denote a minimum time between two consecutive transmissions that are currently allowed (i.e., a minimum idle time (or duration) between a transmission duration and another transmission duration)). In addition, "DUTY CYCLE" may denote a ratio expressed as a percentage of the maximum transmitter on one carrier frequency, related to 1 second.

For example, V2X TX UE(s) (performing V2X communication on a 5.9 GHz ITS band) may be allowed to select time(/frequency) resource(s) related to PDCCH and/or PSSCH transmission, under the following (some) rules, in order to abide by the aforementioned restriction related to (minimum) T_ON (and/or (minimum) T_OFF).

Herein, for example, the restriction related to (minimum) T_ON (and/or (minimum) T_OFF) may be abided by only when the V2X TX UE(s) performs a (re)transmission operation based on: (A) the same transport block (TB); and/or (B) the same (scheduled) bandwidth. Herein, for example, for convenience of explanation, it is assumed hereinafter that time resource location (time resource pattern (TRP)) information related to PSSCH transmission is signaled through a field on the PSCCH.

Figure 8:
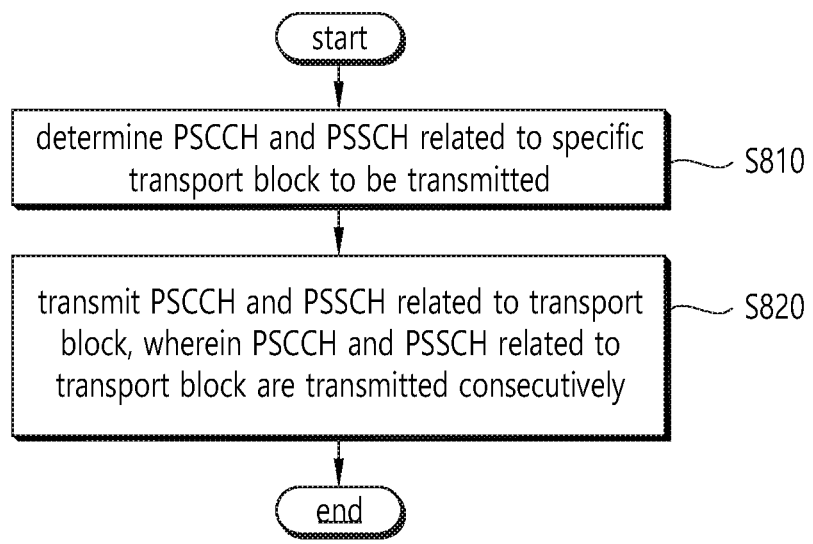
FIG. 8 is a flowchart of a method for transmitting a PSCCH and PSSCH related to a transport block according to an embodiment of the present invention.

FIG. 8 is a flowchart of a method for transmitting a PSCCH and PSSCH related to a transport block according to an embodiment of the present invention.

Referring to FIG. 8, a terminal may determine a PSCCH and PSSCH related to a specific transport block to be transmitted (S810). In this case, the PSCCH may imply the aforementioned SA, and the PSSCH may imply the aforementioned data. Herein, an example of the PSCCH and PSSCH related to the specific transport block will be described below in detail.

Thereafter, the terminal may transmit the PSCCH and PSSCH related to the transport block (S820). In this case, the PSCCH and PSSCH related to the transport block may be consecutively transmitted during a transmission duration. For example, all of the PSCCHs and PSSCHs related to the specific transport block may be transmitted only during the transmission duration. In addition, for example, it may be determined whether the PSCCH and the PSSCH are transmitted on one subframe distinctively on a frequency axis or whether the PSCCH and the PSSCH are transmitted on different subframes distinctively on a time axis. In addition, for example, when a channel busy ratio (CBR) is high, the PSCCH and the PSSCH may be transmitted on one subframe distinctively on the frequency axis. In addition, for example, the PSCCH and the PSSCH may be transmitted in a frequency division multiplexing (FDM) manner. In addition, for example, when the CBR is low, the PSCCH and the PSSCH may be transmitted on different subframes distinctively on the time axis. In addition, for example, the PSCCH and the PSSCH may be transmitted in a time division multiplexing (TDM) manner. In addition, for example, the PSCCH and PSSCH related to the specific transport block may be transmitted repeatedly only within the transmission duration. In addition, for example, when a plurality of PSSCHs are associated with the PSCCH, the plurality of PSSCHs may be transmitted consecutively with respect to the PSCCH. In addition, for example, when the PSCCH is transmitted on an $N^{th}$ subframe within the transmission duration, the plurality of PSSCHs may be transmitted consecutively starting from the $N^{th}$ subframe, and the PSCCH and the PSSCH transmitted on the $N^{th}$ subframe may be distinctive on a frequency axis, where N is a natural number. In addition, for example, when the PSCCH is transmitted on an $N^{th}$ subframe within the transmission duration, the plurality of PSSCHs may be transmitted consecutively starting from an $(N+1)^{th}$ subframe, where N is a natural number. In addition, for example, when the PSCCH and the PSSCH are transmitted at different time points and an interval greater than or equal to a pre-set value is required between the PSCCH transmission and the PSSCH transmission, a transmission resource having an interval less than the pre-set value from the PSCCH transmission may be excluded from a transmission resource of the PSSCH. In addition, for example, the PSCCH may be a sidelink control channel, and the PSSCH may be a sidelink data channel. Hereinafter, the present invention will be described in greater detail.

[Proposal method#1] For example, V2X TX UE(s) may be allowed to (entirely) perform (a plurality of) PSSCH (re)transmission associated with (specific TB related) PSCCH transmission on consecutive subframes (within (minimum) T_ON).

Herein, for example, when a corresponding rule is applied, if (specific TB related) PSCCH transmission is performed on a time point SF#N, associated (a plurality of) PSSCH (re)transmission may be (entirely) performed on consecutive subframes after the time point SF#N (e.g., when PSCCH and PSSCH transmissions are performed in a TDM manner) (or may be (entirely) performed on subsequent consecutive subframes including the time point SF#N (e.g., when PSCCH and PSSCH transmissions are performed in an FDM manner)).

Herein, for example, when the corresponding rule is applied, it may be interpreted that a (candidate) TRP related to (a plurality of) corresponding PSSCH (re)transmission that can be selected by the V2X TX UE(s) is restricted in order to (entirely) perform (a plurality of) PSSCH (re) transmission associated with (specific TB related) PSCCH transmission on consecutive subframes (within (minimum) T_ON).

[Proposed method#2] For example, upon performing (a plurality of (NUM_DATA)) PSSCH (re)transmission associated with a plurality of (NUM_SA) PSCCH transmissions (previously configured (/signaled)) for specific TB transmission, if NUM_SA PSCCH transmissions are performed on a discontinuous (subframe) time point, the associated (NUM_DATA) PSSCH (re)transmission may be (necessarily) performed on a (subframe) time point which is not used between at least (NUM_SA) PSCCH transmissions.

Herein, for example, when the corresponding rule is applied, (NUM_DATA) PSSCH (re)transmission associated with (specific TB related) NUM_SA PSCCH transmissions may be (entirely) performed on consecutive subframes (within (minimum) T_ON).

Herein, for example, when the above rule is applied, if (specific TB related) PSCCH transmission is performed on time points SF#N and SF#(N+2) (e.g., "NUM_SA=2"), associated (a plurality of (e.g., "NUM_DATA=4")) PSSCH (re)transmissions may be performed on time points SF#(N+1), SF#(N+3), SF#(N+4), and SF#(N+5) (e.g., when PSCCH and PSSCH transmissions are performed in a TDM manner) (or may be performed on time points SF#N, SF#(N+1), SF#(N+2), and SF#(N+3) (e.g., when PSCCH and PSSCH transmissions are performed in an FDM(/TDM) manner)).

Herein, for example, when the above rule is applied, it may be interpreted that a (candidate) TRP related to corresponding (NUM_DATA) PSSCH (re)transmission that can be selected by the V2X TX UE(s) is restricted in order to (entirely) perform (NUM_DATA) PSSCH (re)transmission associated with (specific TB related) NUM_SA PSCCH transmissions on consecutive subframes (within (minimum) T_ON).

[Proposed method#3] For example, when (a plurality of) PSSCH (re)transmission associated with (specific TB related) PSCCH transmission is performed on different (subframe) time points (e.g., PSCCH and PSSCH transmissions are performed in a TDM manner) and (at least) (minimum) T_OFF (interval) shall be ensured between corresponding (PSCCH/PSSCH) transmission time points, V2X TX UE(s) may be allowed to exclude a PSSCH (re)transmission resource in which (at least) (minimum) T_OFF (interval) cannot be separated from a PSCCH transmission time point from a selectable candidate (irrespective of a (measured) PSSCH DM-RS RSRP value).

For example, although the present invention describes the proposed method based on the 3GPP LTE system for convenience of explanation, the range of applying the proposed method can also be extended to another system other than the 3GPP LTE system.

For example, the proposed methods of the present invention can also be extendedly applied for D2D communication. Herein, for example, the D2D communication implies that a UE communicates directly with another UE by using a radio channel. Herein, for example, although the UE implies only a user terminal, a network device such as a base station may also be considered as a sort of the UE when a signal is transmitted/received according to a communication scheme between the UEs.

In addition, for example, the proposed methods of the present invention may also be limitedly applied only to a mode-2 V2X operation (and/or a mode-1 V2X operation).

Further, examples for the aforementioned proposed methods can also be included as one of methods implemented by the present invention, and thus apparently can be considered as a sort of proposed methods. In addition, the aforementioned proposed methods can be implemented independently, or can be implemented by combining (or merging) some of the proposed methods.

Herein, a detailed example for the aforementioned transmission of the PSCCH and PSSCH for the specific transport block is described below by taking an example in which the PSCCH and the PSSCH are transmitted distinctively on a frequency axis and an example in which the PSCCH and the PSSCH are transmitted distinctively on a time axis.

First, an example in which a terminal transmits the PSCCH and PSSCH for the specific transport block distinctively on the frequency axis, wherein the terminal transmits the PSCCH and the PSSCH on one subframe is described below.

Figure 9:
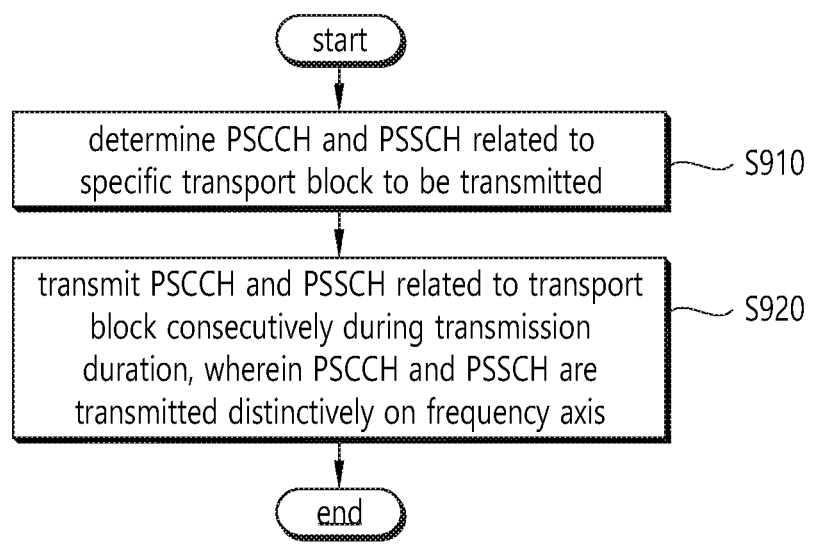
FIG. 9 is a flowchart of a method for transmitting a PSCCH and PSSCH related to a transport block according to another embodiment of the present invention.

FIG. 9 is a flowchart of a method for transmitting a PSCCH and PSSCH related to a transport block according to another embodiment of the present invention.

Referring to FIG. 9, a terminal may determine a PSCCH and PSSCH related to a specific transport block to be transmitted (S910). Herein, since an aspect of the PSCCH and PSSCH related to the specific transport block is the same as described above, detailed descriptions thereof will be omitted hereinafter.

Thereafter, the terminal may consecutively transmit the PSCCH and PSSCH related to the transport block during a transmission duration (S920). In this case, the PSCCH and the PSSCH may be transmitted distinctively on a frequency axis. For example, all of the PSCCHs and PSSCHs related to the specific transport block may be transmitted only during the transmission duration. In addition, for example, it may be determined whether the PSCCH and the PSSCH are transmitted on one subframe distinctively on a frequency axis or whether the PSCCH and the PSSCH are transmitted on different subframes distinctively on a time axis. In addition, for example, when a channel busy ratio (CBR) is high, the PSCCH and the PSSCH may be transmitted on one subframe distinctively on the frequency axis. In addition, for example, the PSCCH and the PSSCH may be transmitted in a frequency division multiplexing (FDM) manner. In addition, for example, when a plurality of PSSCHs are associated with the PSCCH, the plurality of PSSCHs may be transmitted consecutively with respect to the PSCCH. In addition, for example, when the PSCCH is transmitted on an $N^{th}$ subframe within the transmission duration, the plurality of PSSCHs may be transmitted consecutively starting from the $N^{th}$ subframe, and the PSCCH and the PSSCH transmitted on the $N^{th}$ subframe may be distinctive on a frequency axis, where N is a natural number. In addition, for example, when the PSCCH is transmitted on an $N^{th}$ subframe within the transmission duration, the plurality of PSSCHs may be transmitted consecutively starting from an $(N+1)^{th}$ subframe, where N is a natural number. In addition, for example, when the PSCCH and the PSSCH are transmitted at different time points and an interval greater than or equal to a pre-set value is required between the PSCCH transmission and the PSSCH transmission, a transmission resource having an interval less than the pre-set value from the PSCCH transmission may be excluded from a transmission resource of the PSSCH. In addition, for example, the PSCCH may be a sidelink control channel, and the PSSCH may be a sidelink data channel. Hereinafter, the present invention will be described in greater detail.

For example, as described above, a V2X TX UE(s) may be allowed to (entirely) perform (a plurality of) PSSCH (re)transmission associated with (specific TB related) PSCCH transmission on consecutive subframes (within (minimum) T_ON).

Herein, for example, when a corresponding rule is applied, if (specific TB related) PSCCH transmission is performed on a time point SF#N, associated (a plurality of) PSSCH (re)transmission may be (entirely) performed on consecutive subframes after the time point SF#N (e.g., when PSCCH and PSSCH transmissions are performed in a TDM manner) (or may be (entirely) performed on subsequent consecutive subframes including the time point SF#N (e.g., when PSCCH and PSSCH transmissions are performed in an FDM manner)).

Herein, for example, when the corresponding rule is applied, it may be interpreted that a (candidate) TRP related to (a plurality of) corresponding PSSCH (re)transmission that can be selected by the V2X TX UE(s) is restricted in order to (entirely) perform (a plurality of) PSSCH (re) transmission associated with (specific TB related) PSCCH transmission on consecutive subframes (within (minimum) T_ON).

Further, an example thereof will be described below with reference to the drawings.

Figure 10:
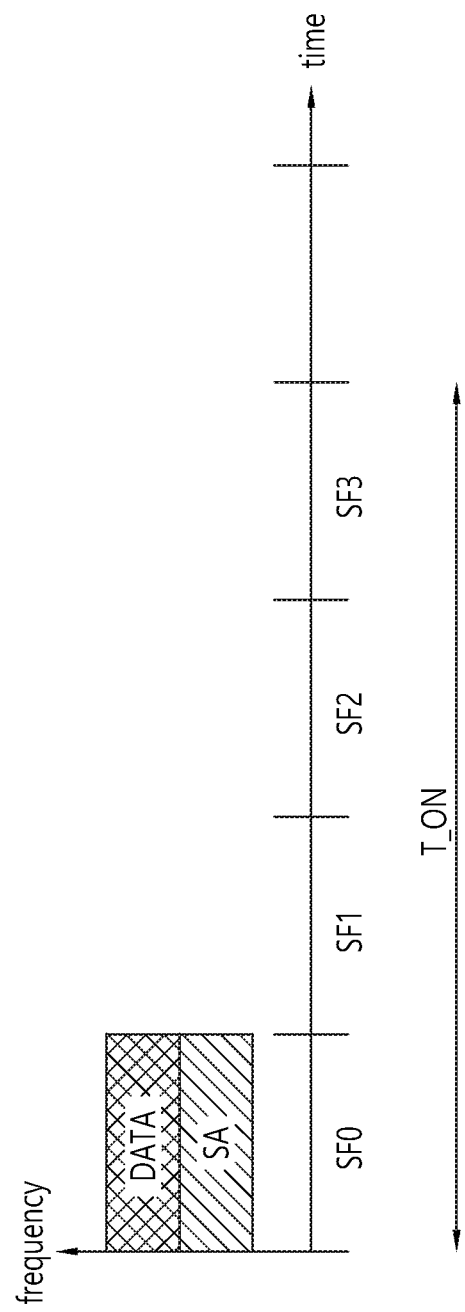
FIG. 10 schematically shows an example in which a V2X terminal transmits a PSCCH and a PSSCH on one subframe.

FIG. 10 schematically shows an example in which a V2X terminal transmits a PSCCH and a PSSCH on one subframe.

Referring to FIG. 10, a terminal may transmit a PSCCH (e.g., SA) and PSSCH (e.g., data) for a specific transport block distinctively on a frequency axis on a subframe 0 (e.g., SF0). This may imply that the PSCCH and PSSCH for the specific transport block transmitted in this case are transmitted only during a transmission duration (e.g., T_ON). In other words, this may imply that the PSCCH and PSSCH for the specific transport block are transmitted only during a transmission duration of the terminal. Herein, when it is said that the PSCCH and the PSSCH are transmitted distinctively on the frequency axis during the specific duration, this may imply that the PSCCH and the PSSCH for the specific transport block are transmitted in a frequency division multiplexing (FDM) manner.

Herein, when the terminal transmits the PSCCH and the PSSCH in the FDM manner during the specific duration, since the V2X terminal transmits all of the SA and the data on one subframe, occupancy of a radio resource is minimized in terms of time, thereby solving a latency problem. In addition thereto, since another V2X terminal (or base station) has to receive the transmitted SA and data only in the above subframe time point (i.e., a subframe in which the V2X terminal transmits the SA and the data), a half-duplex problem can be mitigated.

Further, for example, as described above, when the terminal transmits the PSCCH and the PSSCH in the FDM manner during the specific duration, it is possible to mitigate the half-duplex problem of the terminal and to solve the latency problem. Therefore, the transmitting of the PSCCH and the PSSCH in the FDM manner by the terminal during the specific duration may be applied when a CBR is high.

In addition thereto, when the terminal repeatedly transmits the PSCCH and the PSSCH for the specific transport block distinctively on a time axis, wherein the terminal repeatedly transmits the PSCCH for the specific transport block during the specific transmission duration, PSSCH transmission may be performed during a duration in which PSCCH transmission is not performed during a transmission duration, and an example thereof will be described below.

Figure 11:
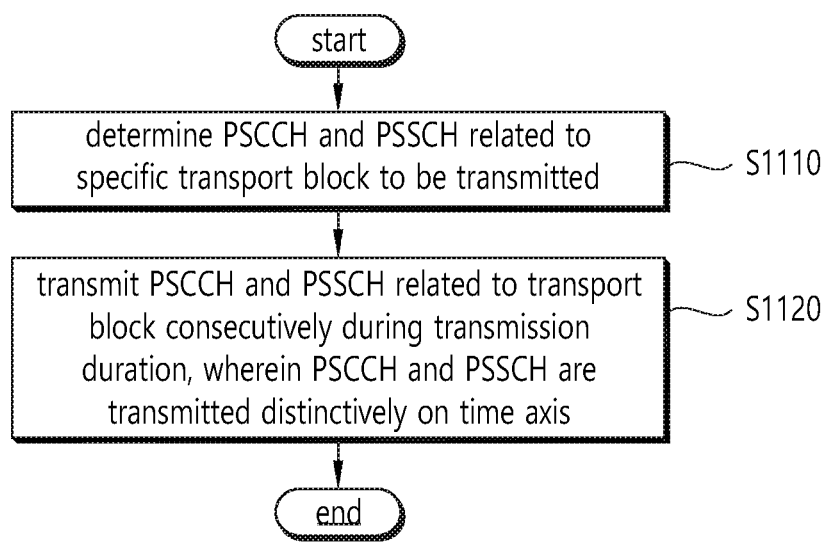
FIG. 11 is a flowchart of a method for performing transmission of a PSCCH and PSSCH related to a transport block according to anther embodiment of the present invention.

FIG. 11 is a flowchart of a method for performing transmission of a PSCCH and PSSCH related to a transport block according to anther embodiment of the present invention.

Referring to FIG. 11, a terminal may determine a PSCCH and PSSCH related to a specific transport block to be transmitted (S1110). Herein, since an aspect of the PSCCH and PSSCH related to the specific transport block is the same as described above, detailed descriptions thereof will be omitted hereinafter.

Thereafter, the terminal may consecutively transmit the PSCCH and PSSCH related to the transport block during a transmission duration (S1120). In this case, the PSCCH and the PSSCH may be transmitted distinctively on a time axis. For example, all of the PSCCHs and PSSCHs related to the specific transport block may be transmitted only during the transmission duration. In addition, for example, it may be determined whether the PSCCH and the PSSCH are transmitted on one subframe distinctively on a frequency axis or whether the PSCCH and the PSSCH are transmitted on different subframes distinctively on a time axis. In addition, for example, when the CBR is low, the PSCCH and the PSSCH may be transmitted on different subframes distinctively on the time axis. In addition, for example, the PSCCH and the PSSCH may be transmitted in a time division multiplexing (TDM) manner. In addition, for example, the PSCCH and PSSCH related to the specific transport block may be transmitted repeatedly only within the transmission duration. In addition, for example, when a plurality of PSSCHs are associated with the PSCCH, the plurality of PSSCHs may be transmitted consecutively with respect to the PSCCH. In addition, for example, when the PSCCH is transmitted on an $N^{th}$ subframe within the transmission duration, the plurality of PSSCHs may be transmitted consecutively starting from the $N^{th}$ subframe, and the PSCCH and the PSSCH transmitted on the $N^{th}$ subframe may be distinctive on a frequency axis, where N is a natural number. In addition, for example, when the PSCCH is transmitted on an $N^{th}$ subframe within the transmission duration, the plurality of PSSCHs may be transmitted consecutively starting from an $(N+1)^{th}$ subframe, where N is a natural number. In addition, for example, when the PSCCH and the PSSCH are transmitted at different time points and an interval greater than or equal to a pre-set value is required between the PSCCH transmission and the PSSCH transmission, a transmission resource having an interval less than the pre-set value from the PSCCH transmission may be excluded from a transmission resource of the PSSCH. In addition, for example, the PSCCH may be a sidelink control channel, and the PSSCH may be a sidelink data channel Hereinafter, the present invention will be described in greater detail.

For example, upon performing (a plurality of (NUM_DATA)) PSSCH (re)transmission associated with a plurality of (NUM_SA) PSCCH transmissions (previously configured (/signaled)) for specific TB transmission, if NUM_SA PSCCH transmissions are performed on a discontinuous (subframe) time point, the associated (NUM_ DATA) PSSCH (re)transmission may be (necessarily) performed on a (subframe) time point which is not used between at least (NUM_SA) PSCCH transmissions.

Herein, for example, when a corresponding rule is applied, (NUM_DATA) PSSCH (re)transmission associated with (specific TB related) NUM_SA PSCCH transmissions may be (entirely) performed on consecutive subframes (within (minimum) T_ON).

Herein, for example, when the above rule is applied, if (specific TB related) PSCCH transmission is performed on time points SF#N and SF#(N+2) (e.g., "NUM_SA=2"), associated (a plurality of (e.g., "NUM_DATA=4") PSSCH (re)transmissions may be performed on time points SF#(N+1), SF#(N+3), SF#(N+4), and SF#(N+5) (e.g., when PSCCH and PSSCH transmissions are performed in a TDM manner) (or may be performed on time points SF#N, SF#(N+1), SF#(N+2), and SF#(N+3) (e.g., when PSCCH and PSSCH transmissions are performed in an FDM(/TDM) manner)).

Herein, for example, when the above rule is applied, it may be interpreted that a (candidate) TRP related to corresponding (NUM_DATA) PSSCH (re)transmission that can be selected by the V2X TX UE(s) is restricted in order to (entirely) perform (NUM_DATA) PSSCH (re)transmission associated with (specific TB related) NUM_SA PSCCH transmissions on consecutive subframes (within (minimum) T_ON).

Further, an example thereof (NUM_SA=3, NUM_DATA=3; i.e., SA (or PSCCH) for a specific transport block is performed three times and data (or PSSCH) is transmitted three times in one transmission period (e.g., 6 ms)) will be described below with reference to the drawings.

Figure 12:
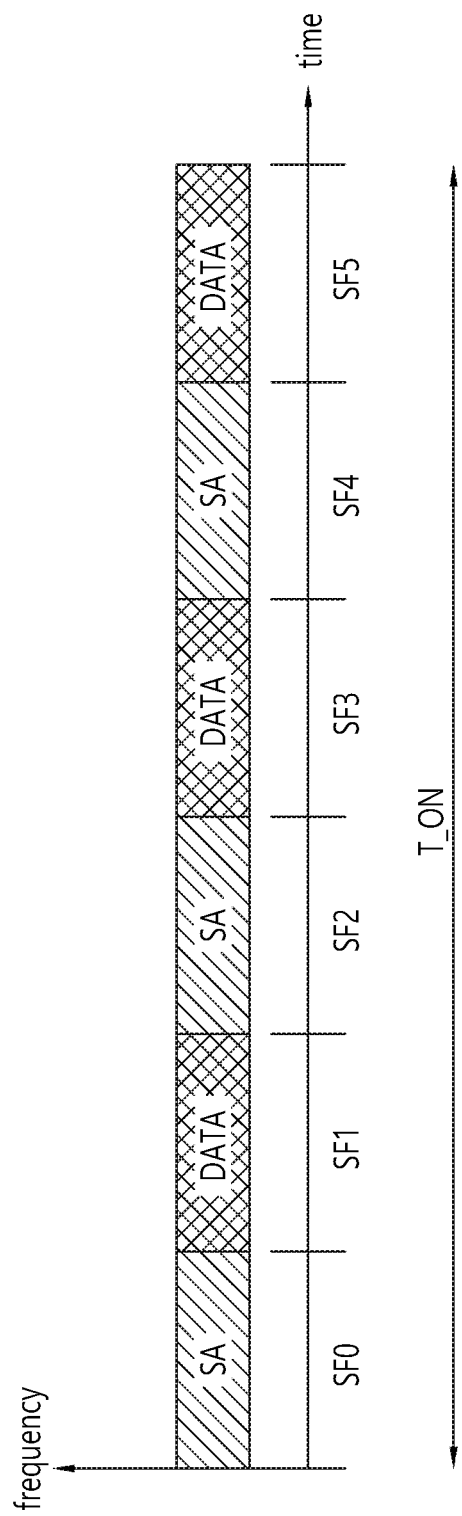
FIG. 12 schematically shows an example in which a terminal transmits a PSCCH and a PSSCH distinctively on a time axis.

FIG. 12 schematically shows an example in which a terminal transmits a PSCCH and a PSSCH distinctively on a time axis.

Referring to FIG. 12, when a terminal transmits a PSCCH (e.g., SA) for a specific transport block on a subframe 0, a subframe 2, and a subframe 4 (e.g., SF0, SF2, SF4), the terminal may transmit a PSSCH (e.g., data) for the specific transport block in a subframe 1, a subframe 3, and a subframe 5. In other words, when the PSCCH and PSSCH for the specific transport block are repeatedly transmitted, this may imply that the repeated transmission is necessarily performed during a transmission duration of the terminal. Herein, when it is said that the PSCCH and PSSCH are transmitted distinctively on a time axis during the specific duration, it may imply that the PSCCH and PSSCH for the specific transport block are transmitted in a time division multiplexing (TDM) manner.

Herein, when the terminal repeatedly transmits the PSCCH and the PSSCH in the TDM manner during the specific duration, since another terminal (or base station) has to receive only any one of PSCCH and PSSCH sets repeatedly transmitted, transmission reliability of the PSCCH and PSSCH for the transport block can be improved. Further, for example, the above case may be applied when a CBR is low.

Figure 13:
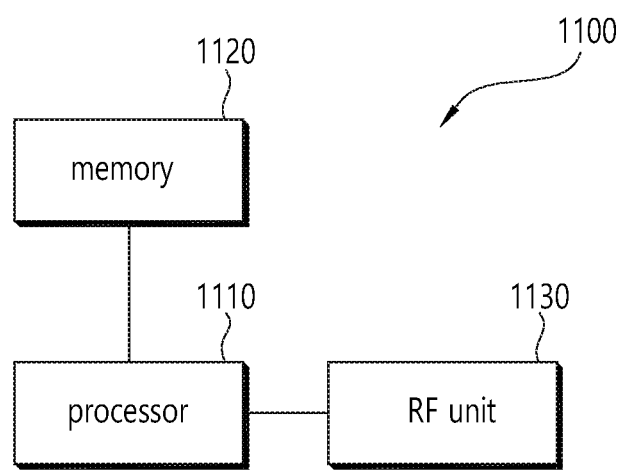
FIG. 13 is a block diagram of a terminal according to an embodiment of the present invention.

FIG. 13 is a block diagram of a terminal according to an embodiment of the present invention.

Referring to FIG. 13, a terminal 1100 includes a processor 1110, a memory 1120, and a radio frequency (RF) unit 1130.

According to an embodiment, the processor 1110 may perform functions/operations/methods described in the present invention. For example, the processor 1110 may be configured to determine a physical sidelink control channel (PSCCH) and physical sidelink shared channel (PSSCH) related to a specific transport block to be transmitted, and transmit the PSCCH and PSSCH related to the transport block, wherein the PSCCH and the PSSCH are consecutively transmitted during a transmission duration.

The RF unit 1130 coupled to the processor 1110 may transmit and receive a radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

What is claimed is:
1. A method for transmitting at least one physical sidelink control channel (PSCCH) and at least one physical sidelink shared channel (PSSCH) in a wireless communication system, the method comprising:
determining the at least one PSCCH and the at least one PSSCH to be transmitted, wherein both the at least one PSCCH and the at least one PSSCH are related to a specific transport block (TB); and transmitting the at least one PSCCH and at least one PSSCH related to the transport block, wherein both the at least one PSCCH and the at least one PSSCH are transmitted during a transmission duration for the specific TB, and wherein, based on a channel busy ratio (CBR) being low:
the at least one PSCCH is transmitted on at least one first subframe distinguished from at least one second subframe, on which the at least one PSSCH is transmitted,
the at least one first subframe is adjacent to the at least one second subframe on the time axis, and
the at least one first subframe and the at least one second subframe are located during the transmission duration.

2. The method of claim 1, wherein, based on the CBR being high, the at least one PSCCH and the at least one PSSCH are transmitted on one subframe distinctively on the frequency axis.

3. The method of claim 2, wherein the at least one PSCCH and the at least one PSSCH are transmitted in a frequency division multiplexing (FDM) manner.

4. The method of claim 1, wherein, based on a plurality of PSSCHs being associated with the at least one PSCCH, the plurality of PSSCHs are transmitted adjacent to the at least one PSCCH.

5. The method of claim 4,
wherein, based on the at least one PSCCH being transmitted on an $N^{th}$ subframe within the transmission duration, the plurality of PSSCHs are transmitted consecutively starting from the $N^{th}$ subframe, and
wherein the at least one PSCCH and the at least one PSSCH, which is one PSSCH among the plurality of PSSCHs, transmitted on the $N^{th}$ subframe are distinctive on a frequency axis, where N is a natural number.

6. The method of claim 4, wherein, based on the at least one PSCCH being transmitted on an $N^{th}$ subframe within the transmission duration, the plurality of PSSCHs are transmitted consecutively starting from an $(N+1)^{th}$ subframe, where N is a natural number.

7. The method of claim 1, wherein, based on the at least one PSCCH and the at least one PSSCH being transmitted at different time points and an interval greater than or equal to a pre-set value is required between a transmission of the at least one PSCCH and a transmission of the at least one PSSCH, a transmission resource having an interval less than the pre-set value from the transmission of the at least one PSCCH is excluded from a transmission resource of the at least one PSSCH.

8. The method of claim 1, wherein the at least one PSCCH is a sidelink control channel, and the at least one PSSCH is a sidelink data channel.

9. A vehicle-to-X (V2X) user equipment (UE) comprising:
a transceiver; and
a processor operatively coupled to the transceiver, wherein the processor is configured to:
determine at least one physical sidelink control channel (PSCCH) and at least one physical sidelink shared channel (PSSCH) to be transmitted,
wherein both the at least one PSCCH and the at least one PSSCH are related to a specific transport block (TB); and
control the transceiver to transmit the at least one PSCCH and the at least one PSSCH,
wherein both the at least one PSCCH and the at least one PSSCH are transmitted during a transmission duration for the specific TB, and
wherein, based on a channel busy ratio (CBR) being low:
the at least one PSCCH is transmitted on at least one first subframe distinguished from at least one second subframe, on which the at least one PSSCH is transmitted,
the at least one first subframe is adjacent to the at least one second subframe on the time axis, and
the at least one first subframe and the at least one second subframe are located during the transmission duration.

* * * * *